United States Patent Office.

STUART GWYNN, OF NEW YORK, N. Y., ASSIGNOR TO SPENCER M. CLARK, OF WASHINGTON, DISTRICT OF COLUMBIA.

Letters Patent No. 81,495, dated August 25, 1868.

IMPROVEMENT IN PREPARING OILS.

The Schedule referred to in these Letters Patent and making part of the same.

TO ALL WHOM IT MAY CONCERN:

Be it known that I, STUART GWYNN, of the city, county, and State of New York, have invented a new Preparation of Oils, used as vehicles for spreading and attaching pigments to surfaces, and for similar purposes; and I do hereby declare the following to be a full and exact description thereof, and of the mode of preparing the same.

The nature of my invention consists in a new and improved process for treating linseed and other oils, which is partly chemical and partly mechanical, as hereinafter fully described, whereby I obtain a new and valuable product, possessing superior advantages for use in painting and other mechanical purposes.

The forms of apparatus and mechanical appliances which I have found best adapted to effectuate my process for producing my improved oils are fully described in a separate application for Letters Patent which I shall file herewith, and to which reference may be had for details, and I shall herein only specify the same in general terms. In the use of oil of vitriol in my process, I employ an agent which for many years past has been used in the purification of oils, with a view to carbonize particles thereof. In some of the processes, attempts have been made to subsequently remove and neutralize the acid thus employed, by means of carbonates of the alkalies and alkaline earths. With petroleum, and with fixed animal and greasy vegetable oils for lubrication and burning, reasonably good products have thus been obtained, and when petroleum thus treated is redistilled, an excellent illuminating-oil has been produced, but the results have never been satisfactory with oils for painting. I have, by my process, obtained perfect success in the preparation of such oils. This process naturally divides itself into five operations, as follows:

First, oxidizing: subsidence and decantation.
Second, neutralizing: subsidence and decantation.
Third, steaming: subsidence and decantation.
Fourth, evaporation of aqueous and other volatile matters foreign to the oil and injurious if left therein: subsidence and decantation.
Fifth, sun-bleaching.

The first operation, viz, oxidation, is effected by treating linseed or other oil with sulphuric acid of 66° Baumé, in the proportion of from two and a half to five pounds of acid, by weight, to one hundred gallons of oil, the oil being kept, by suitable mechanical appliances, in a state of constant and violent agitation, and the acid meanwhile added thereto very slowly, in exceedingly minute quantities. It is better that the agitation of the oil begin before the first dose of acid is put in, and that it be continued without intermission for at least two hours after the entire quantity has been added. The acid may be added in small quantities every half hour, until the proper proportion has been used. After subsidence for at least fifteen hours, the clear oil remaining is carefully decanted into a vessel and heated. I prefer to obtain the necessary heat from a steam-pipe in the bottom of the vessel, the pipe being covered to a depth of about one inch with water before the oil is introduced, and the steam may be allowed to escape from the pipe in fine jets, and pass up through the oil, to heat the same. So soon as the oil is heated, all scum rising to the surface is carefully removed.

The second operation, viz, neutralization, is now effected by adding milk of caustic lime to the oil in small quantities, at intervals of from ten to fifteen minutes, the oil being kept constantly heated, and the ebullition of steam through the same, if steam be thus used, continually maintained. In the mean time, constant tests are made with litmus-paper or other suitable agents, and so soon as the slightest alkaline reaction is observed, the addition of the milk of lime is discontinued. Any excess of the lime would form a soap, entailing an absolute loss of a portion of the oil, and injurious to the remainder. It is desirable that the oil be kept heated for two or three hours after its neutralization has thus been effected, to allow a complete separation of foreign matters therefrom, and a deposit thereof by subsidence with the sulphate of lime. After standing from ten to fifteen hours, the clear oil is again decanted with care into a third vessel, for the third operation, viz, steaming.

This consists in submitting the oil to the direct action of steam passing through the same for from four to five hours, which will produce a molecular change in the oil, predisposing it to unite more readily with oxygen, and also causing it to part with aqueous and other particles detrimental thereto. After subsidence, the oil is drawn off clear, from the watery sediment in the steaming-tank into an open vessel or boiler, in which, as the fourth operation, it is heated up to a temperature of from 215° to 400° Fahrenheit, and kept at this point for from three to five hours, depending upon the use to which the oil is to be applied, and the nature of the raw oil used. After being allowed to cool and subside in the boiler, the clear oil is finally run into shallow bleaching-vats or tanks, to a depth of from four to twelve inches, and exposed five days or more to the action of light, to render it clear and colorless.

Having thus fully described my invention, I claim as new, and desire to secure by Letters Patent—

Oils prepared and purified in the manner which I have herein set forth.

STUART GWYNN.

Witnesses:
W. G. MONROE,
L. BOUVIER.